United States Patent [19]

Groenewegen

[11] Patent Number: 4,532,543
[45] Date of Patent: Jul. 30, 1985

[54] HIGH CHANNEL DENSITY COMMUNITY ANTENNA ARRANGEMENT HAVING LOW INTERMODULATION PRODUCTS

[75] Inventor: Willem F. M. Groenewegen, Eindhoven, Netherlands

[73] Assignee: U.S. Philips Corporation, New York, N.Y.

[21] Appl. No.: 448,563

[22] Filed: Dec. 10, 1982

[30] Foreign Application Priority Data

Dec. 14, 1981 [NL] Netherlands ............ 8105609

[51] Int. Cl.³ .................. H04N 7/10; H04H 1/06
[52] U.S. Cl. ........................................... 358/86; 455/3
[58] Field of Search ................ 358/86; 455/3, 6

[56] References Cited

U.S. PATENT DOCUMENTS

| | | | |
|---|---|---|---|
| 3,665,316 | 5/1972 | Jeffers | 455/6 |
| 3,742,131 | 6/1973 | Rogeness | 455/6 X |
| 3,835,244 | 9/1974 | Smart | 455/3 X |
| 4,302,771 | 11/1981 | Gargini | 455/6 X |

OTHER PUBLICATIONS

International Telecommunication Union, "Recommendations and Reports of the CCIR, 1978", XIVth Plenary Assembly, Kyoto, 1978, vol. XI, Broadcasting Service (Television) Sec: 11A; Characteristics of Systems for Monochrome and Colour Television, Rec. 470-1, Rep. 624-1, Rec. 418-3 and Rep. 306-3.

Primary Examiner—Keith E. George
Attorney, Agent, or Firm—Thomas A. Briody; William J. Streeter; Edward W. Goodman

[57] ABSTRACT

A frequency-conversion arrangement ($C_1-C_j$, $l_1-l_k$) is connected to a distribution network (II, III) for converting the channel frequency distribution of television signals from an input channel pattern, to an output channel pattern in which output channel pattern the picture carriers of the television signals succeed each other with frequency spacings of which not more than two consecutive frequency spacings are mutually equal. By choosing the picture carrier distances in the second output channel pattern to be equal to an integer multiple of a certain frequency interval, the higher order intermodulation products appear at frequencies which are mutually spaced over fixed distances of the order of this frequency interval which distances equal an integer multiple of the frequency interval relative to the picture carriers. According to the invention, this frequency interval must be chosen so that the intermodulation products predominantly occur in interference-insensitive positions in the TV-signals spectrum, as a result of which the effect of interferences due to intermodulation is significantly reduced.

5 Claims, 6 Drawing Figures

| BG+H 1 (MHz) | BG+H 2 (MHz) | L (MHz) | M (MHz) | I (MHz) | |
|---|---|---|---|---|---|
| 48.25 | 47.50 | 471.25 | 471.25 | 471.25 | |
| 62.25 | 63.25 | 485.05 | 483.75 | 487.25 | |
| 175.25 | 80.60 (P) | 500.55 | 497.55 | 499.85 | |
| 189.25 | 105.25 | 512.55 | 508.65 | 514.25 | |
| 203.25 | 117.50 | 526.35 | 518.45 | 528.65 | |
| 217.25 | 133.25 | 541.85 | 530.95 | 541.25 | |
| 471.25 | 147.25 | 555.65 | 544.75 | 557.25 | |
| 487.25 | 157.75 | 571.15 | 555.85 | 569.85 | |
| 501.00 | 175.25 | 583.15 | 568.35 | 584.25 | |
| 511.25 | 187.50 | 596.95 | 582.15 | 598.65 | |
| 529.00 | 203.25 | 612.45 | 593.25 | 611.25 | |
| 541.25 | 217.25 | 626.25 | 603.05 | 627.25 | |
| 557.00 | 227.75 | 641.75 | 615.55 | 639.85 | |
| 571.00 | 245.25 | 653.75 | 629.35 | 654.25 | |
| 611.25 | 257.50 | 667.55 | 640.45 | 668.65 | |
| 627.00 | 273.25 | 683.05 | 652.95 | 681.25 | |
| 641.00 | 287.25 | 696.85 | 666.75 | 697.25 | |
| 651.50 | 297.75 | 712.35 | 677.85 | 709.85 | |
| 669.00 | 315.25 | 724.35 | 687.65 | 724.25 | |
| 681.25 | 327.50 | 738.15 | 700.15 | 738.65 | |
| 697.00 | 343.25 | 753.65 | 713.95 | 751.25 | |
| 711.25 | 357.25 | 767.45 | 725.05 | 767.25 | |
| 751.25 | 367.75 | 782.95 | 737.55 | 779.85 | |
| 767.25 | 385.25 | 794.95 | 751.35 | 794.25 | |
| 781.00 | 397.50 (P) | 808.75 | 762.45 | 808.65 | |
| 791.25 | | 824.25 | 772.25 | 821.25 | |
| 809.00 | | 838.05 | 784.75 | 837.25 | |
| 821.25 | | 853.55 | 798.55 | 849.85 | |
| 837.00 | | | 809.65 | | |
| 851.00 | | | 822.15 | | |
| | | | 835.95 | | |
| | | | 847.05 | | |
| | | | 856.85 | | |
| | | | 869.35 | | |
| | | | 883.15 | | |
| 38,9 | 32,7 | 45,75 | 39,5 | | TV.MF |
| 70,0 | 70,6 | 84,6 | 70,0 | | blklngt |

HIGH CHANNEL DENSITY COMMUNITY ANTENNA ARRANGEMENT HAVING LOW INTERMODULATION PRODUCTS

BACKGROUND OF THE INVENTION

The invention relates to a community antenna arrangement for a frequency-division multiplex transmission of at least four television signals, comprising a frequency-conversion arrangement, connected to a distribution network, for converting the frequency distribution of the television signals from an input channel frequency distribution pattern, hereinafter referred to as channel pattern, into an output channel pattern. In the output channel pattern the picture carriers of the television signals succeed each other with frequency spacings of which not more than two consecutive frequency spacings are mutually equal.

Such a community antenna arrangement is disclosed in German Offenlegungsschrift No. 2.738.217.

Generally, in the distribution network of a community antenna arrangement for frequency-division multiplex transmission of TV signals, one or more broadband signal processing operations are effected. Several channels are submitted, as one frequency-division multiplex signal, to the same operation. Such broadband signal processing operations may, for example, be: block conversion in which the frequency of several channels are jointly converted, broadband amplification, broadband electro-optical or opto-electrical conversions, etc. Non-linearities cannot be prevented from occurring in practice, even if circuits having highly linearized frequency characteristics for these broadband processing operations are used.

These non-linearities produce intermodulation products which, depending on the number, frequency and amplitude of the radio and/or television signals to be transmitted, cause disturbances to a greater or lesser extent. Particularly, the intermodulation products of the carriers, and more specifically, the intermodulation products of the picture carriers of the TV-signals to be transmitted are important in this respect, because of their comparatively large amplitude.

The disturbing effect of second order intermodulation products can be reduced in several ways, for example, by using balanced circuits, such as push-pull amplifiers or by limitation of the frequency range in which the above-mentioned broadband non-linear signal processings are operative to a maximum of 1 octave, such as occurs, for example, with VHF/UHF split-band amplification. With said, prior art community antenna arrangement, the object is to reduce unwanted second order interferring products, caused by VHF-signals in combination with UHF-signals, by using a certain channel pattern, such that said interferring products occur outside the channels or at less critical places within the channels.

In the prior art community antenna arrangement, measures are not taken to suppress the interferences due to 3rd and higher order intermodulation products. Generally, the amplitude of the $3^{rd}$ and higher order intermodulation products are smaller than the amplitude of the second order intermodulation products, for which reason little attention is paid to their suppression in the prior art community antenna arrangement.

However, the increasing demand for ever more TV programs causes an increasing occupation of the available frequency space in the distribution network of the majority of community antenna arrangements. The number of higher order intermodulation products compared with the number of second order intermodulation products, increases significantly with the number of TV programs to be transmitted. This increase in the number of higher order intermodulation products is so great that when a large number of TV programs (for example 30 or more) are to be transmitted, the interference aspect is predominantly determined by these higher order intermodulation products.

SUMMARY OF THE INVENTION

The invention has for its object to divide the frequency spectrum, which is available in the beforementioned distribution network for a frequency-division multiplex transmission of TV-signals, into a channel pattern such that on the transmission of several TV-signals, which are frequency distributed in accordance with that channel pattern, in each of the occupied channels, the total power sum of all the intermodulation products weighted in accordance with the frequency dependent weighting factor associated with the protection curve of the relevant signal standard, is less than with the prior art community antenna arrangement.

According to the invention, a community antenna arrangement of the type defined in the opening paragraph, is characterized in that the largest spacing is less than twice the smallest frequency spacing and each of the frequency spacings is an integer multiple of a frequency interval, which frequency interval is at least substantially equal to 1.75 MHz for TV-signals of the CCIR-standards B, G and H, 1.7 MHz for TV-signals of the CCIR-standard L, 1.4 MHz for TV-signals of the CCIR-standard M and 1.8 MHz for TV-signals of the CCIR-standard I, these standards being defined in "Recommendations and Reports of the CCIR, 1978" Vol. XI.

The invention is based on the recognition that in a channel pattern having consecutively varying picture carrier spacings, which are equal to an integer multiple of a fixed frequency-interval, the picture carrier intermodulation products occur at frequency distances relative to the picture carriers which are also integer multiple of the frequency interval. Compared with a channel pattern having a fixed picture carrier spacing, the concentrations of picture carrier intermodulation products in situ of the picture carriers, where the interference sensitivity of TV-signals is large, are smaller and a uniform and fine distribution of small concentrations of these interference products occur in a pattern having a fixed frequency spacing of the order of the frequency interval. By relating this frequency interval to positions on the protection curve of the TV-signals to be transmitted, having a low protection value, that is to say frequencies where the sensitivity to interference of the TV-signals to be transmitted is low, the total power sum of the intermodulation products within each occupied channel can be reduced to a considerable extent.

When the measure in accordance with the invention is used, a frequency conversion of at least four TV-signals is effected from an input channel pattern, for example a uniform input channel pattern into an output channel pattern, in which concentrations of picture carrier intermodulation products predominantly occur at frequencies where the sensitivity to interference of the TV-signals to be transmitted is at least 3 dB and on an average 8 to 30 dB, depending on the relevant TVstandard, less than the sensitivity in situ of the picture carrier frequency. As a result thereof, the total power sum of the intermodulation products weighted in accordance with the relevant protection curve is considerably smaller than in a channel pattern having predominantly fixed carrier spacings, as is used in the prior art community antenna arrangement.

A preferred embodiment of a community antenna arrangement in accordance with the invention is characterized in that the picture carrier frequency of these four television signals deviates less than 0.30 MHz from an integer multiple of the frequency interval of 1.75 MHz for TV-signal standards B, G and H, 1.7 MHz for the TV-signal standard L, 1.4 MHz for the TV-signal standard M and 1.8 MHz for the TV-signal standard I.

The use of this measure in accordance with the invention is particularly advantageous for transmission within frequency ranges larger than 1 octave, for example the VHF-frequency range, and results, in the event of nonlinear signal processing operations because of the said frequency choice of the TV-signal, in a minimal intermodulation interference for each TV-signal.

A further embodiment of a community antenna arrangement in accordance with the invention is characterized in that the output channel pattern for TV-signals of the CCIR-standards B, G, H and I is repeated in frequency bands of substantially 70 MHz, for TV-signals of the CCIR-standard L is repeated in frequency bands of substantially 70.6 MHz, for TV-signals of the CCIR-standard M is repeated in frequency bands of substantially 84.6 MHz.

When this measure is used, the disturbing effect of image frequencies and oscillator radiation is prevented from occurring.

A further preferred embodiment of a community antenna arrangement in accordance with the invention is characterized in that at full occupation of when the output channel pattern is fully occupied, the picture carrier spacings for the CCIR TV-signal standards B, G and H are, in a cyclic sequence, substantially 15.75 MHz, 14 MHz, 10.5 MHz, 17.5 MHz and 12.25 MHz, for the CCIR TV-signal standard L, substantially 13.8 MHz, 15.5 MHz, 12.0 MHz, 13.8 MHz and 15.5 MHz; for the CCIR TV-signal standard M, substantially 12.5 MHz, 13.8 MHz, 11.1 MHz, 9.8 MHz, 12.5 MHz, 13.8 MHz and 11.1 MHz; and for CCIR TV-signal standard Y, substantially 16.0 MHz, 12.6 MHz, 14.4 MHz, 14.4 MHz and 12.6 MHz.

When this measure is used a compact frequency distribution of TV-signals within the available frequency spectrum is possible at a minimal interference due to intermodulation, image frequencies and oscillator radiation.

A still further preferred embodiment of such a community antenna arrangement is characterized in that at full occupation of the output channel raster in the output channel pattern for TV-signals of the CCIR standards B, G and H, a number of picture carrier frequencies are chosen to be at least substantially equal to: 471.25 MHz, 487.25 MHz, 501.00 MHz, 511.25 MHz, 529.00 MHz, 541.25 MHz, 557.00 MHz, 571.00 MHz, 611.25 MHz, 627.00 MHz, 641.00 MHz, 651.50 MHz, 669.00 MHz, 681.25 MHz, 697.00 MHz, 711.25 MHz, 751.25 MHz, 767.25 MHz, 781.00 MHz, 791.25 MHz, 809.00 MHz, 821.25 MHz, 837.00 MHz and 851.00 MHz.

DESCRIPTION OF THE DRAWING

The invention will now be further described with reference to the Figures which are shown by way of example in the accompanying drawings.

Herein:

FIG. 6 shows a practical choice of a channel pattern in accordance with the invention for the TV-signal standards B, G, H; L; M and I.

DESCRIPTION OF THE PREFERRED EMBODIMENT

Figure 1:
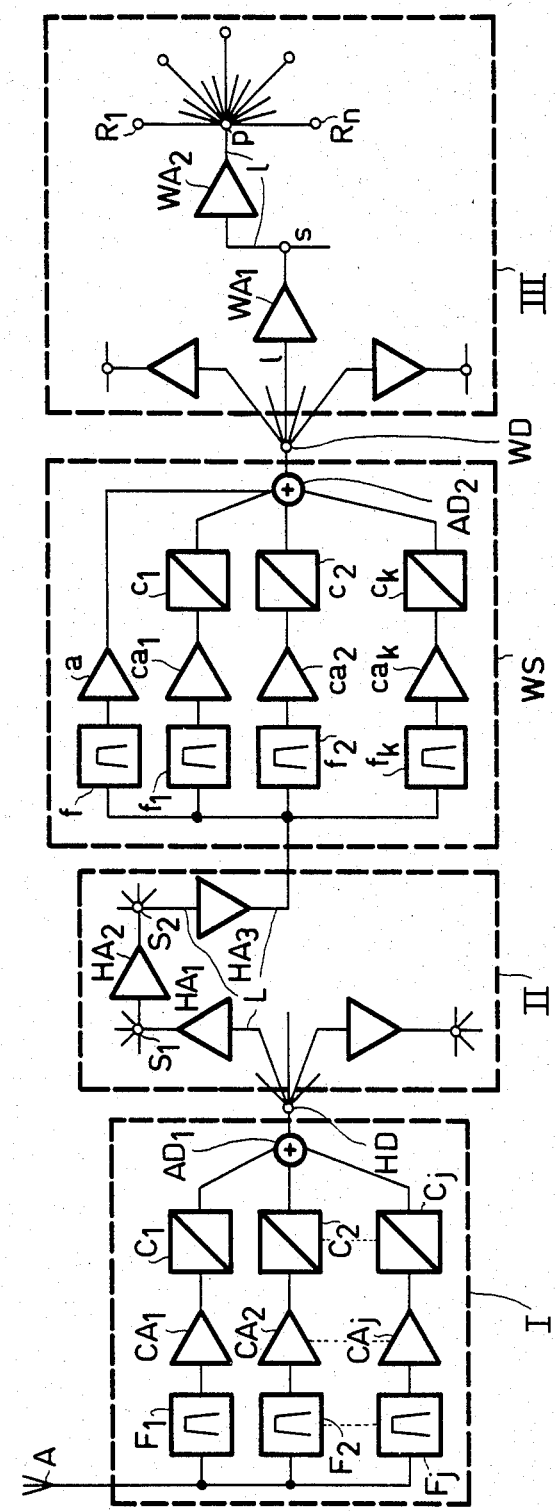
FIG. 1 shows a community antenna arrangement in accordance with the invention.

FIG. 1 shows a community antenna arrangement in accordance with the invention, comprising a signal receiving arrangement A, and, coupled successively to the receiving arrangement A, a main station I, a main distribution arrangement HD followed by a main distribution network II and a district station WS, a district distribution arrangement WD followed by a district distribution network III comprising a distribution point P and subscriber's connections $R_1$ to $R_n$, inclusive. For the sake of clarity, only the signal path from the receiving arrangement A to one distribution point P is shown in full in the Figure. In this signal path, a number of j television signals received by the receiving arrangement A are subjected to the following signal processing operations:

1. In the main station I the received TV-signals are selected channel-by-channel by means of channel filters $F_1$ to $F_j$, inclusive, adjusted to a desired level by means of channel amplifiers $CA_1$ to $CA_j$, inclusive, and frequency-converted by means of channel converters $C_1$ to $C_j$, inclusive. In this channel-by-channel frequency conversion, the frequency distribution of the TV-signals as received, designated the first input channel pattern hereinafter, is converted into a so-called first output channel pattern and which will be further described hereinafter. Thereafter the individual TV-signals at the outputs of the channel converters $C_1$ to $C_j$, inclusive are added together in an adder arrangement $AD_1$ to form one broad-band frequency-division multiplex TV-signal, and which is applied to the main distribution arrangement HD.

2. In the main distribution arrangement HD, the frequency-division multiplex signal is distributed over several trunk lines and applied to the district station WS via one of these trunk lines. During this transmission procedure, the frequency-division multiplex TV-signals are conveyed through broad-band trunk amplifiers $HA_1$ to $HA_3$, inclusive, which serve to compensate for the cable losses occurring in the trunk lines L, and through sub-distribution stations $S_1$ and $S_2$ via which signals are transmitted to further district stations, not shown. Herein, the frequency-division multiplex TV-signal is subjected a number of times to a broad-band amplification and distribution, respectively, where, owing to non-linearities, intermodulation products are produced within the frequency transmission band.

So as to keep the cable losses low, the frequency range region of the frequency-division multiplex TV-signal is preferably chosen to be restricted to the VHF-region. The restriction of the transmission capacity which results therefrom can be eliminated by the use of parallel trunk lines.

3. In the district station WS there is effected, for a number of k TV-signals in said frequency-division multiplex TV-signal, which, owing to their frequency position, cannot be processed in normal TV-receivers, a frequency conversion into frequencies in the UHF-range, to which tuning is indeed possible. To that end there are successively effected a channel-by-channel selection in parallel channel filters $f_1$ to $f_k$, inclusive, an adjustment to a desired level in channel amplifiers $ca_1$ to $ca_k$, inclusive, an in channel converters $c_1$ to $c_k$, inclusive, a frequency conversion of these k TV-signals from a frequency distribution in accordance with the first output channel pattern or the second input channel pattern into a frequency distribution in accordance with a second output channel pattern. The remaining j-k TV-signals only require a level adjustment, possibly channel-by channel, which can be achieved by means of one or more parallel channel filter(s) f and channel amplifier(s) a.

Thereafter, the individual TV-signals at the outputs of the channel amplifiers a and channel converters $c_1$ to $c_k$, inclusive are added together in an adder arrangement $AD_2$ to form one broadband frequency-division multiplex TV-signal, that is to say one broad-band signal in which the individual TV-signals are frequency-division multiplexed in accordance with the second output channel pattern. The further transmission of this frequency-division multiplex TV-signal proceeds via district distribution lines in which sub-division stations are incorporated for a further distribution to terminal distribution points and broad-band line amplifiers, not shown, to compensate for cable and distribution losses. Herein the frequency-division multiplex TV-signal is again subjected to a number of broad-band amplifications and distributions, which, as in the main distribution network, introduces a further large number of intermodulation products owing to non-linearities.

Via district distribution lines $\rho$, a subdistribution station s and broad-band line amplifiers $WA_1$ and $WA_2$ the desired TV-signals are applied to a distribution point P from which signals are applied to subscribers' connections $R_1$ to $R_n$, inclusive.

The present invention relates to the choice of said first and second output channel patterns. These output channel patterns can be realized by means of channel converters which are known per se and which each effect a fixed or adjustable channel conversion.

In the embodiment shown, a channel pattern conversion is effected in the main and district stations. The inventive idea is, however, applicable to any TV-signal distribution system wherein several TV-signals are transmitted as one frequency-division multiplex TV-signal, and subjected to non-linear signal processing operations. The invention is realized by means of a frequency conversion which precedes the relevant non-linear signal processing operation(s) and wherein a transition is effected from an existing input channel pattern to an output channel pattern in accordance with the invention. For the community antenna arrangement as shown, this means that use of the invention may be restricted by the frequency conversion in the main station I and need not necessarily be applied to the frequency conversion in the district station WS to achieve the before mentioned object.

Generally, the existing channel patterns are uniform, that is to say at full occupation, the picture carriers of the TV-signals to be transmitted succeed each other with a fixed frequency spacing. If the picture carrier of the first TV-signal is located at $f_1$ and if the mutual frequency spacing is $\Delta f$, then the picture carrier of the second TV-signal is located at $f_1 + \Delta f$, that of the third TV-signal at $f_1 + 2\Delta f$, etc. Non-linear signal processing operations introduce intermodulation products, the intermodulation products due to the picture carriers of the TV-signals being considerably larger than those due to the remaining TV-signal components, such as, for example, the sound or chrominance sub-carriers. Therefore, the notion intermodulation relates hereinafter to the picture carrier intermodulation. If a large number of TV-signals are to be transmitted, the interference pattern is particularly determined by the third order intermodulation products having frequencies of the shape $f_p + f_q - f_r$ and, to a lesser extent $2f_p - f_q$, because of their number and amplitude.

With television signals in a uniformly divided channel pattern, the last-mentioned third order intermodulation products occur at the carrier frequencies of other television signals, as from: $f_p = f_1 + p.\Delta f$; $f_q = f_1 + q\Delta f$; $f_r = f_1 + r\Delta f$, wherein p, q and r are integrals and $p \neq q \neq r$, it follows that $f_p + f_q - f_r = f_1 + (p+q-r)\Delta f$ and $2f_p - f_q = f_1 + (2p-q)\Delta f$, at which frequencies the picture carriers $f_{p+q-r}$ and $f_{2p-q}$ are located.

For all TV-signal standards, the sensitivity to interference of a TV-signal is at least substantially at its maximum at or near the picture carrier, which is shown by the so-called protection curve. The protection curves for the TV-signal standards B/G/H, L, M and I are shown in the FIGS. 2 to 5, respectively, and each show shows the relative sensitivity to interference in dB of a TV-signal of the relevant standard as a function of the frequency. The protection curves shown are assembled from data obtained from CCIR-reports 306-3 and 418-3, Volume XI, 1978.

The intermodulation interference can be reduced when the consecutive picture carrier spacings between the TV-signals to be transmitted are not maintained at a fixed value but are varied so that the intermodulation products predominantly appear at those frequencies of the TV-signal spectrum, where the sensitivity to interference is at least less than the sensitivity at or near the picture carrier. This is achieved by quantizing the variation of the consecutive picture carrier distances in a variable but integral number of times a frequency interval, which frequency interval is related to interference-insensitive positions on the protection curve.

Figure 2:
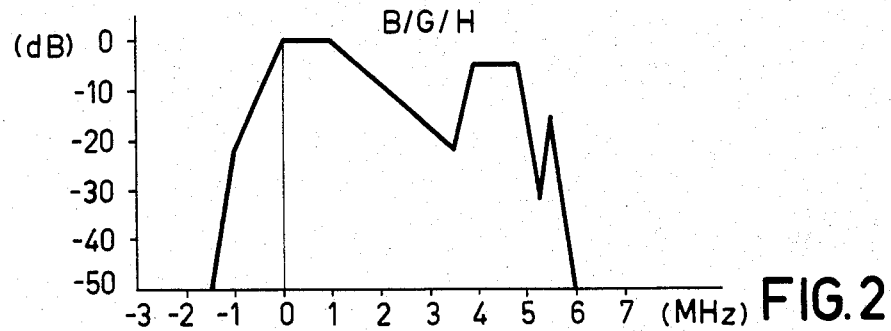
FIG. 2 shows the protection curve for TV-signals in accordance with the CCIR standards B, G and H.

From the protective curve for the TV-signal standard B/G/H shown in FIG. 2, it can be seen that with mutual picture carrier spacings which consecutively amount to a variable but integer multiple of a frequency interval of 1.75 MHz, the last-mentioned third order intermodulation products predominantly appear at frequencies where the sensitivity to interference is at least 7 dB lower than that at or near the picture carrier frequency. Within the TV-spectrum shown, said intermodulation products then appear at frequency spacings of 1.75 MHz, 3.5 MHz and 5.25 MHz relative to the picture carrier frequency where the sensitivity to interference is, respectively, approximately 7 dB, 22 dB and 33 dB less than the sensitivity to interference in the region of the picture carrier frequency. A number of intermodulation products do indeed also occur in the region of the picture carrier frequency but this number is considerably less, due to the spread over the TV-signal spectrum, than with the existing channel patterns. In addition, a considerable number of intermodulation products occur between the spectra of the TV-signals, where they cannot cause interference. The total power sum of the intermodulation products weighted in accordance with the protection curve shown is less at said choice of picture carrier spacings than with a fixed picture carrier spacing.

It is obvious that for an effective reduction of said power sum, the relevant intermodulation products need not occur accurately at said spacings with respect to the picture carrier but may deviate somewhat therefrom. In practice it has been found that satisfactory results can be achieved if the intermodulation products occur in a frequency range of + or −0.3 MHz around said frequency spacings, that is to say in the frequency ranges 1.45–2.05 MHz; 3.2–3.8 MHz and 4.95–5.55 MHz relative to the picture carrier. The permissible deviations in the actual picture carrier frequencies of the TV-signals and the spacings there between in the ultimate channel pattern in accordance with the invention are thereby determined.

Figure 3:
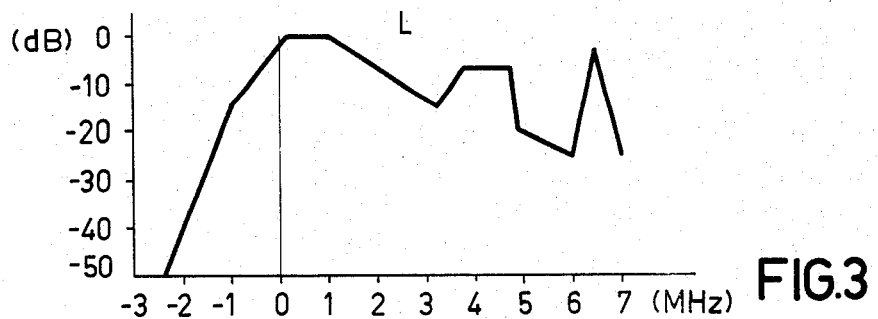
FIG. 3 shows the protection curve for TV-signals in accordance with the CCIR standard L.

From the protection curve for the TV-signal standard L shown in FIG. 3 it can be derived that the width of the aforementioned frequency interval must here be chosen to be equal to 1.7 MHz and that a deviation of + or −0.2 MHz is permissible for this frequency interval. Within the TV-signal spectrum shown, the sensitivity to interference in the region of −1.7 MHz, 1.7 MHz, 3.4 MHz, 5.1 MHz and 6.8 MHz relative to the picture carrier frequency is, respectively, 34, 4, 12, 21 and 22 dB, less than the sensitivity to interference in the region of the picture carrier frequency, and for an efficient use of the invention, the relevant intermodulation products must occur, within the frequency ranges −1.9 to −1.5 MHz; 1.5 to 1.9 MHz; 3.2–3.6 MHz; 4.9–5.3 MHz; 6.6–7.0 Mhz relative to the picture carrier frequency.

Figure 4:
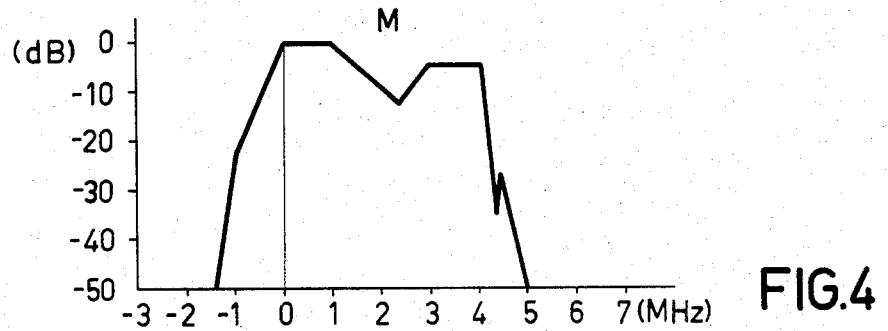
FIG. 4 shows the protection curve for TV-signals in accordance with the CCIR standard M.

From the protection curve for the TV-signal standard M, shown in FIG. 4 it can be derived that said frequency interval must here be 1.4 MHz for an optimum spread of intermodulation products over interference-insensitive positions within the TV-signal spectrum and that a deviation of + or −0.2 MHz from this frequency interval is permissible. The sensitivity to interference in the region of −1.4 MHz, 1.4 MHz, 2.8 MHz and 4.2 MHz relative to the picture carrier frequency is, respectively, 48, 3, 8 and 13 dB less than the sensitivity to interference in the region of the picture carrier frequency and an effective use of the invention is obtained when at least said intermodulation products occur within the frequency ranges −1.6 to −1.2 MHz; 1.2 to 1.6 MHz; 2.6 to 3.0 MHz; 4.0 to 4.4 MHz relative to the picture carrier frequency.

Figure 5:
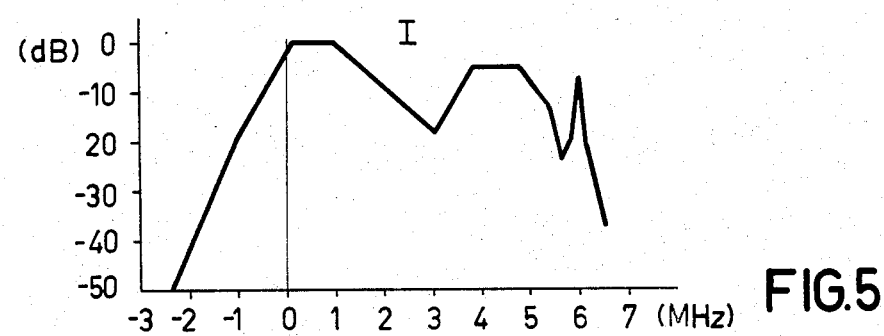
FIG. 5 shows the protection curve for TV-signals in accordance with the CCIR standard I.

From the protection curve for the TV-signal standard I, shown in FIG. 5 it can be derived that the frequency interval in question must be 1.8 MHz and that a deviation therefrom of + or −0.2 MHz can be tolerated. The sensitivity to noise within the TV-signal spectrum shown, in the region of −1.8 Mhz, 1.8 MHz, 3.6 MHz and 5.4 MHz relative to the picture carrier frequency is, respectively, 37, 7, 10 and 15 dB, less than the sensitivity to interference at or near the picture carrier and an efficient use of the invention is obtained when at least the beforementioned intermodulation products occur within the frequency ranges −2.0 to −1.6 MHz; 1.6 to 2.0 MHz; 3.4 to 3.8 MHz; 5.2 to 5.6 MHz relative to the picture carrier frequency.

With a transmission of TV-signals in the VHF-range, as for example, in the main distribution network II, the overall frequency transmission range comprises more than 1 octave, particularly when there is a large number of TV-signals. As a result thereof, intermodulation products having frequencies of the form $f'_p + f'_q$, $f'_p + f'_q$ $f'_r$, $2f'_p + f'_q$, $f'_p - f'_q$ etc. occur within the transmission band and may produce interferences in TV-signals which are located further on in the spectrum (e.g. at more than 1 octave distance from $f'_p$, $f'_q$ or $f'_r$). So as to have also these intermodulation products occur in the aforementioned interference-insensitive positions, the picture carrier frequencies themselves must also amount to an integer multiple of the frequency interval laid down for the relevant TV-signal standard. In practice, it has been found that for a proper operation of the invention for the TV-signal standard B/G/H, an absolute deviation of 0.30 MHz is permissible and for the other TV-signal standards mentioned an absolute deviation of 0.20 MHz from the picture carrier frequencies thus determined is permissible. An example of such a VHF-channel pattern in accordance with the invention is shown in FIG. 6, in column 2 sub B/G/H.

In the district station WS, the television signals located in the VHF range are converted to the so-called second output channel pattern. This frequency conversion enables reception and processing of the TV-signals by normal TV-receivers but may alternatively be used to realize such a channel distribution of the available frequency space that there is not only a minimal intermodulation interference but that also the disturbing effect of image frequencies and oscillator radiation on the subscriber's connections $R_1$ and $R_n$, inclusive, are kept at a minimum. In accordance with the invention, this is achieved by dividing the total available frequency space into equal frequency blocks having a predetermined block length, to be described hereinafter, and to choose the consecutive picture carrier distances of the TV-signals in these blocks to be equal to a variable but integer multiple of the relevant frequency interval. Said block length must then deviate by such a frequency distance from twice the TV-intermediate frequency used that, for each TV-signal, the picture and sound carrier image frequencies deviate for an integer multiple of the last-mentioned frequency interval from the picture carrier frequency.

When, in addition, the picture carrier spacings are varied in a mutually corresponding manner within each frequency block, a frequency-periodical channel pattern is obtained and a compact and substantially undisturbed transmission of a large number of TV-signals is possible.

In practice it has been found that good results can be achieved for the TV-signal standard B/G/H, in which a TV-intermediate frequency of 38.9 MHz is used, where the repeat or frequency-block length is 70.0 MHz and, within each frequency block, consecutive picture carrier spacings of approximately 15.75 MHz, 14 MHz, 10.5 MHz, 17.5 MHz and 12.25 MHz are chosen; for the TV-signal standard L, in which a TV-intermediate frequency of 32.7 MHz is used, when the frequency-block length or repeat is 70.6 MHz and, within each frequency block, consecutive picture carrier spacings of approximately 13.8 MHz, 15.5 MHz, 12.0 MHz, 13.8 MHz and 15.5 MHz are chosen; for the TV-signal standard M, in which a TV-intermediate frequency of 45.75 MHz is used, where a frequency-block length or repeat is 84.6 MHz and, within each frequency block, consecutive picture carrier spacings of approximately 12.5 MHz, 13.8 MHz, 11.1 MHz; 9.8 MHz. 12.5 MHz, 13.8 MHz and 11.1 MHz are chosen; for the TV-signal standard I, in which a TV-intermediate frequency of 39.5 MHz is used, where a frequency-block length or repeat is 70.0 MHz and, within each frequency block, consecutive picture carrier spacings of approximately 16.0 MHz, 12.6 MHz, 14.4 MHz, 14.4 MHz and 12.6 MHz are chosen.

It will be obvious that the use of the channel pattern in accordance with the invention is not limited to the district distribution network III, but that when used in the main distribution network II, it will also cause a particularly low disturbance of the TV-signals to be transmitted. Furthermore, it is not necessary to divide the total available frequency space into a channel pattern in accordance with the invention, but a very acceptable interference suppression can already be obtained by dividing, for example, only the UHF-transmission range into a channel pattern in accordance with the invention while maintaining a normal, for example, uniform frequency distribution of TV-signals in the VHF-range. In addition, it is not necessary to fully occupy the channel pattern in accordance with the invention, but when the channel is only partly occupied the advantages offered by the invention can also be obtained.

FIG. 6 shows by way of example the picture carrier frequencies of TV-signals, at full occupation of the aforementioned output channel pattern in accordance with the invention for the TV-signal standards B/G/H, L, M and I in correspondingly designated columns. For the TV-signal standard B/G/H, column 1 shows a normal prior art VHF-channel pattern in combination with a UHF-channel pattern, which is for the greater part in accordance with the invention. Column 2 shows a VHF-channel pattern in accordance with the invention, more specifically for use in the main distribution network II. The frequencies designated "P" in this column 2 represent pilot frequencies for signal amplitude equalization in the several trunk amplifiers. For the other TV-signal standards L, M and I only UHF-channel patterns in accordance with the invention are shown. This does not exclude the possibility of a combination with VHF-TV-signals, in a conventional channel pattern or in a channel pattern in accordance with the invention.

In addition, for each TV-signal standard mentioned, the associated customary TV-intermediate frequency is shown and the block length associated therewith.

What is claimed is:

1. A community antenna arrangement for a frequency-division multiplex transmission of at least four television signals, comprising a frequency-conversion arrangement connected to a distribution network for converting the frequency distribution of the television signals from an input channel pattern to an output channel pattern, in which output channel pattern the picture carriers of the television signals succeed each other with frequency spacings of which not more than two consecutive frequency spacings are mutually equal, characterized in that the largest frequency spacing is less than twice the smallest frequency spacing and each of the frequency spacings is an integer multiple of a frequency interval, which frequency interval is at least substantially equal to 1.75 MHz for TV-signals of the CCIR-standards B, G and H, 1.7 MHz for TV-signals of the CCIR-standard L, 1.4 MHz for TV-signals of the CCIR-standard M and 1.8 MHz for TV-signals of the CCIR-standard I.

2. A community antenna arrangement as claimed in claim 1, characterized in that the picture carrier frequency of each of the four television signals deviates less than 0.30 MHz from an integer multiple of the frequency interval of 1.75 MHz for the TV-signal standards B, G and H, 1.7 MHz for the TV-signal standard L, 1.4 MHz for the TV-signal standard M and 1.8 for the TV-signal standard I.

3. A community antenna arrangement as claimed in claim 1 or 2, characterized in that the output channel pattern for TV-signals of the CCIR standards B, G, H and I is repeated in frequency bands of substantially 70 MHz, for TV-signals of the CCIR standard L is repeated in frequency bands of substantially 70.6 MHz, for TV-signals of the CCIR standard M is repeated in frequency bands of substantially 84.6 MHz.

4. A community antenna arrangement as claimed in claim 3, characterized in that with a full occupation of the output channel pattern the picture carrier spacings for the CCIR TV-signal standards B, G and H in a cyclic sequence is substantially 15.75 MHz, 14 MHz, 10.5 MHz, 17.5 MHz and 12.25 MHz, for the CCIR TV-signal standard L substantially 13.8 MHz, 15.5 MHz, 12.0 MHz. 13.8 MHz and 15.5 MHz, for the CCIR TV-signal standard M substantially 12.5 MHz, 13.8 MHz. 11.1 MHz, 9.8 MHz, 12.5 MHz, 13.8 MHz and 11.1 MHz and for the CCIR TV-signals standard I substantially 16.0 MHz, 12.6 MHz, 14.4 MHz, 14.4 MHz, 12.6 MHz.

5. A community antenna arrangement as claimed in claim 3, characterized in that in the output channel pattern for CCIR standard B, G and H TV-signals with a full occupation of the output channel patterns the picture carrier frequencies are chosen to be substantially equal to: 471.25 MHz, 487.25 MHz, 501.00 MHz, 511.25 MHz, 529.00 MHz, 541.25 MHz, 557.00 MHz, 571.00 MHz, 611.25 MHz, 627.00 MHz, 641.00 MHz, 651.50 MHz, 669.00 MHz, 681.25 MHz, 697.00 MHz, 711.25 MHz, 751.25 MHz, 767.25 MHz, 781.00 MHz, 791.25 MHz, 809.00 MHz, 821.25 MHz, 837.00 MHz and 851.00 MHz.

* * * * *